United States Patent
Gaertner et al.

(10) Patent No.: US 8,096,581 B2
(45) Date of Patent: Jan. 17, 2012

(54) CONVERTIBLE MOTOR VEHICLE WITH ACTIVE ROLLOVER PROTECTION

(75) Inventors: Jan Gaertner, Sindelfingen (DE); Thomas Meier, Berlin (DE); Juergen Schrader, Weil im Schoenbuch (DE); Andreas Zygan, Malsch (DE)

(73) Assignee: Daimler AG, Stuttgart (DE)

( * ) Notice: Subject to any disclaimer, the term of this patent is extended or adjusted under 35 U.S.C. 154(b) by 42 days.

(21) Appl. No.: 12/516,467

(22) PCT Filed: Sep. 18, 2007

(86) PCT No.: PCT/EP2007/008105
§ 371 (c)(1),
(2), (4) Date: Jan. 7, 2010

(87) PCT Pub. No.: WO2008/064729
PCT Pub. Date: Jun. 5, 2008

(65) Prior Publication Data
US 2010/0133799 A1    Jun. 3, 2010

(30) Foreign Application Priority Data
Dec. 1, 2006 (DE) ............ 10 2006 056 754

(51) Int. Cl.
*B60R 21/13* (2006.01)
(52) U.S. Cl. .................... 280/756; 280/727
(58) Field of Classification Search .......... 280/756
See application file for complete search history.

(56) References Cited

U.S. PATENT DOCUMENTS

| | | | | |
|---|---|---|---|---|
| 3,298,731 A | * | 1/1967 | Sangimino | 296/99.1 |
| 4,767,147 A | * | 8/1988 | Kobayakawa et al. | 296/180.1 |
| 4,830,402 A | * | 5/1989 | Matthias et al. | 280/756 |
| 5,056,816 A | * | 10/1991 | Lutze et al. | 280/751 |
| 5,284,360 A | * | 2/1994 | Busch et al. | 280/756 |
| 6,752,422 B2 | * | 6/2004 | Sauermann | 280/748 |
| 7,384,067 B2 | * | 6/2008 | Parks et al. | 280/756 |
| 7,481,458 B2 | * | 1/2009 | Bunsmann et al. | 280/756 |
| 2003/0178833 A1 | * | 9/2003 | Muller | 280/756 |
| 2007/0187992 A1 | * | 8/2007 | Brockhoff | 296/193.06 |
| 2009/0278342 A1 | * | 11/2009 | Browne et al. | 280/756 |

FOREIGN PATENT DOCUMENTS

| | | |
|---|---|---|
| DE | 103 18 076 A1 | 11/2004 |
| DE | 103 57 053 A1 | 2/2005 |
| DE | 103 57 398 B3 | 4/2005 |
| DE | 103 53 448 B3 | 6/2005 |
| EP | 1 818 202 A1 | 8/2007 |

OTHER PUBLICATIONS

International Search Report dated Jan. 16, 2009 and PCT/ISA/237 with partial English translations respectively (Ten (10) pages).

* cited by examiner

*Primary Examiner* — Toan To
(74) *Attorney, Agent, or Firm* — Crowell & Moring LLP

(57) ABSTRACT

A convertible motor vehicle with at least two vehicle seating rows and with at least two side doors is provided. A respectively associated door column is arranged in between the doors, and an active rollover protection system is provided in the region thereof. The door columns end upwards in the region of an associated waistline of the motor vehicle, and the rollover protection system is at least substantially arranged below the waistline of the motor vehicle in a retracted position.

6 Claims, 1 Drawing Sheet

CONVERTIBLE MOTOR VEHICLE WITH ACTIVE ROLLOVER PROTECTION

CROSS REFERENCE TO RELATED APPLICATIONS

Figure 1:
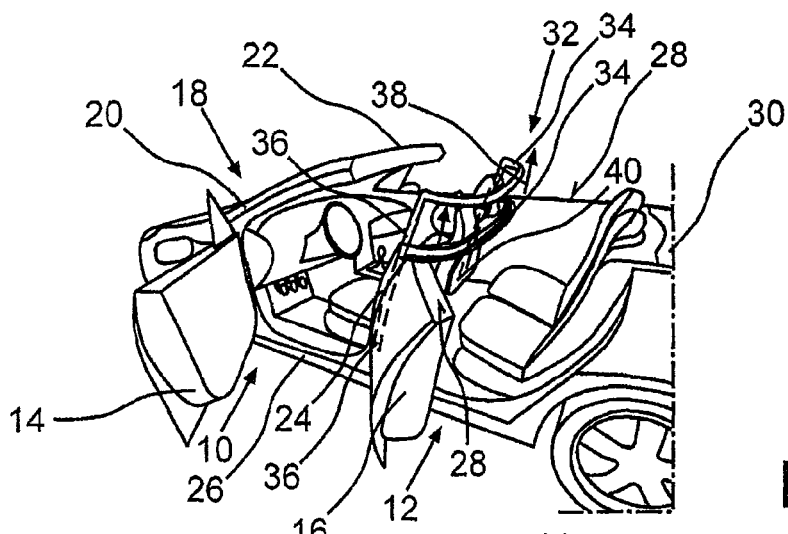

This application is a national stage of PCT International Application No. PCT/EP2007/008105, filed Sep. 18, 2007, which claims priority under 35 U.S.C. §119 to German Patent Application No. 102006056754.4, filed Dec. 1, 2006, the entire disclosures of which are herein expressly incorporated by reference.

BACKGROUND AND SUMMARY OF THE INVENTION

The invention relates to a convertible motor vehicle with at least two vehicle seating rows and with at least two side doors of the type.

Such a convertible motor vehicle is for example already known from German Patent Publication DE 103 57 398 B3, which comprises two vehicle seating rows behind one another, which are accessible via a respective lateral front or rear side door. A respectively associated door column is arranged between the two side doors of each vehicle side, which extends upwards to just under the top of the open motor vehicle. A beam element of an active rollover protection system is respectively arranged within the respective door column, which is moved out in a translational manner when there is an imminent rollover of the motor vehicle.

Exemplary embodiments of the present invention provide a convertible motor vehicle with the rollover protection system integrated in the convertible motor vehicle in a safe and comfortable way. To enable a comfortable and still extremely safe integration of the rollover protection system in the convertible motor vehicle, exemplary embodiments of the present invention provide that the door columns end upwards in the region or at the height of an associated waistline of the motor vehicle, wherein the rollover protection system is substantially arranged below or at the height of the waistline of the motor vehicle in a retracted position. In other words, exemplary embodiments of the present invention provide that the door columns only project up to about the height of the laterally associated waistline of the motor vehicle, which results in a significantly more comfortable view to the outside for the seat occupants. As the door columns are also not in the field of view of the driver according to the invention, the danger of accidents, for example with a cyclist, can furthermore be reduced, and the road safety of the present convertible motor vehicle can thus be increased. If nothing else, due to the fact that the door columns end at the height of the waistline of the motor vehicle, a higher design freedom results for the design engineers of the top or the construction above the waistline.

Even though the door columns according to the invention extend upwards just into the region of an associated waistline, they still have a sufficient height, so that moving parts of the rollover protection system can be brought from the retracted position into a corresponding height-displaced protection position, so as to hereby prevent injuries of the seat occupants during a rollover of the motor vehicle. The arrangement of the rollover protection system in the region of the door columns thereby cooperates with the frame of the windshield of the motor vehicle, so that a cage-like rollover contour is formed altogether, whereby head injuries of the vehicle occupants during a rollover can be prevented or at least reduced to a harmless extent, as a safe distance to the ground is maintained. As a result, it is possible with the rollover protection system according to the invention, to ensure a high standard of safety even with convertible motor vehicles having four doors with a very large interior space region to be opened.

Other objects, advantages and novel features of the present invention will become apparent from the following detailed description of one or more preferred embodiments when considered in conjunction with the accompanying drawings.

BRIEF DESCRIPTION OF THE DRAWING FIGURES

Figure 2:
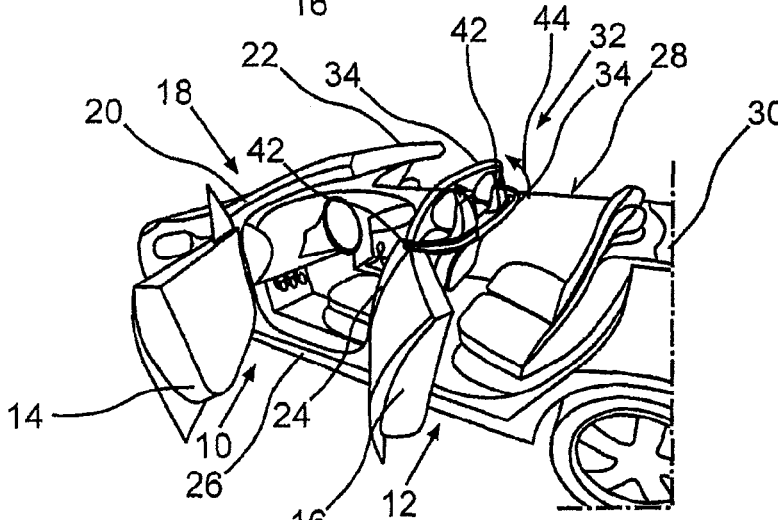
Figure 3:
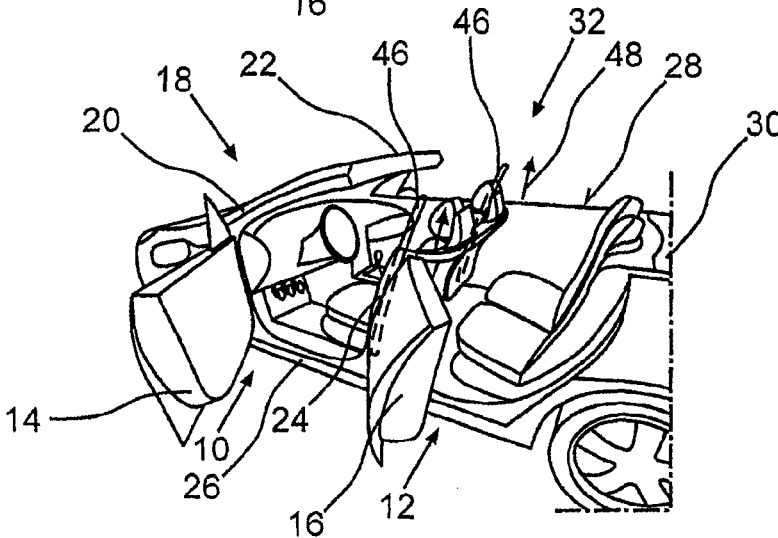

Further advantages, characteristics and details of the invention result from the following description of three embodiments and the drawings; these show in:

FIG. 1 a schematic and partial perspective of a convertible motor vehicle with two vehicle seating rows and with respectively two side doors, between which is arranged a respective door column formed as a B column, wherein a connection element is provided between the door columns, which element can, prior to or during a rollover of the motor vehicle, be moved from a retracted position approximately at the height of a waistline of the motor vehicle into a protection position displaced upwards in a translational movement;

FIG. 2 a schematic and partial perspective of the convertible motor vehicle according to FIG. 1, wherein the connection element between the two door columns is to be displaced from the retracted position into the protection position in a rotary movement around respective bearing positions in the region of the door columns; and FIG. 3 a schematic and partial perspective of the convertible motor vehicle according to FIGS. 1 and 2, wherein the rollover protection system comprises beam elements respectively associated to the door columns, which elements can be moved from the retracted position into a protection position in a translational movement.

DETAILED DESCRIPTION

FIG. 1 illustrates a convertible motor vehicle in a schematic and partial perspective, comprising two vehicle seating rows 10, 12, which can be accessed by front and rear side doors 14, 16 arranged on both sides of the passenger vehicle. The two—seen in the forward driving direction—left side doors 14, 16 are thereby shown in the open position. Two A-columns 20 can be seen in FIG. 1 from a windshield frame 18, which columns are connected to one another at their rear ends by a roof crossmember 22.

An associated door column 24, formed as a B-column, is respectively arranged between the laterally associated side doors 14, 16, which column projects upwards from a side skirt 26 extending below in the longitudinal vehicle direction and horizontally. It can be seen that the two door columns 24 end approximately at the height of a respective laterally associated waistline 28 of the motor vehicle. It is clear that the door columns 24 can also end just below or above the waistline 28 with their respective upper ends. The door columns 24 should altogether not or only insubstantially be seen with an open top of the opened motor vehicle.

It can furthermore be seen in FIG. 1, that the convertible motor vehicle is presently shown with an open top. The convertible top is connected to the windshield frame 18 or to its roof crossbeam 22 towards the rear and is accommodated behind the rear vehicle seating row 12 in a top storage space 30.

It can furthermore be seen from FIG. 1, that the convertible motor vehicle comprises an active rollover protection system 32, which comprises a connection element 34 that connects the two door columns 24, and which is arranged at least substantially below or at the height of the waistline of the motor vehicle in a retracted position. The connection element 34 can be transferred from the lower retracted position into an upper protection position by two beam elements 36, here in a substantially translational movement—as shown by the arrows 38—. The connection element 34 is thereby arranged rigidly at the upper ends of the beam elements 36, wherein the beam elements 36 comprise a corresponding device or mechanics, with which the connection element 34 can be displaced actively from the retracted position into the protection position prior to or during a rollover of the motor vehicle. It can thereby be seen in FIG. 1 that the connection element 34 in its protection position extends approximately parallel to the position which it takes up in its retracted position. It is clear that the connection element 34 in the usual retracted position also contributes to the connection rigidity of the convertible motor vehicle. A separating wall 40 can furthermore be provided below the connection element 34, which wall also extends between the two door columns 24. It would furthermore also be conceivable to provide a further connection element, which connects the door columns 24, and which remains in a lower position during a displacement of the connection element 34 caused by a rollover.

FIG. 2 illustrates a convertible motor vehicle in a schematic and partial perspective according to FIG. 1, wherein the connection element 34 is held by respective bearing positions 42 in the region of the associated door column 24. It is hereby possible to actively move the connection element 34 around the respective bearing positions 42 in a rotary movement shown by the arrows 44 from the retracted position to the protection position. It is clear that a respective rotary drive is provided for this for example in the region of the door columns 24, which then transfers the connection element 34 from the retracted position into the protection position, if a rollover is imminent.

Finally, in FIG. 3 is shown the convertible motor vehicle according to FIGS. 1 and 2 in a schematic and partial perspective, wherein the rollover protection system 32 comprises two beam elements 46, which can be moved from the retracted position into a protection position in a translational movement—as shown by the arrows 48—. It is clear that the beam elements 46 can preferably not be seen in the retracted position. It is thereby for example conceivable to integrate the beam elements 46 in the door columns 24, and to let them project from the front if necessary. The beam elements 46 can thereby also be slightly arcuate, so as to be adapted to the contour of the door column 24.

All three rollover protection systems 32 have collectively in common that their connection elements 34 (FIG. 1, FIG. 2) or their bar elements 46 (FIG. 3) end at least substantially below or at the height of the waistline of the motor vehicle in the retracted position. With an imminent rollover of the convertible motor vehicle, these are then to be brought into the height-displaced protection position in a translational or rotary manner, so as to cooperate with the windshield frame 18 in this position, and to ensure a sufficient safety distance from the ground for the seat occupants.

It shall be included within the scope of the invention that a further rollover protection system can be provided behind the rear vehicle seating row 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A convertible motor vehicle, comprising:
at least two vehicle seating rows;
at least two side doors;
a respectively associated door column arranged between the side doors;
an active rollover protection system provided in a region between the side doors,
wherein the door columns end upwards in a region of an associated waistline of the motor vehicle and the rollover protection system is at least substantially arranged below the waistline of the motor vehicle in a retracted position.

2. The convertible motor vehicle according to claim 1, wherein the rollover protection system comprises a connection element, by which the two door columns are connected to one another.

3. The convertible motor vehicle according to claim 2, wherein the connection element is moveable from the retracted position into a protection position in a translational movement.

4. The convertible motor vehicle according to claim 2, wherein the connection element is moveable from the retracted position into a protection position in a rotary movement around respective bearing positions in the region of the door columns.

5. The convertible motor vehicle according to claim 2, wherein the rollover protection system comprises beam elements associated with the door columns, the beam elements are moveable from the retracted position into a protection position in a translational movement.

6. The convertible motor vehicle according to claim 1, further comprising:
an additional rollover protection system provided in a region of a rear vehicle seating row of the at least two vehicle seating rows.

* * * * *